United States Patent [19]

Plohn et al.

[11] 4,369,408
[45] Jan. 18, 1983

[54] METHOD AND APPARATUS FOR DIGITAL FREQUENCY SELECTION

[75] Inventors: Gerhard Plohn; Manfred Schuh, both of Erlangen; Manfred Wörner, Kirchehrenbach, all of Fed. Rep. of Germany

[73] Assignee: Siemens Aktiengesellschaft, Munich, Fed. Rep. of Germany

[21] Appl. No.: 226,043

[22] Filed: Jan. 19, 1981

[30] Foreign Application Priority Data

Jan. 21, 1980 [DE] Fed. Rep. of Germany ....... 3002018

[51] Int. Cl.³ ...................... H03K 5/26; H03K 19/003
[52] U.S. Cl. .................................. 328/154; 328/110; 328/114; 328/133
[58] Field of Search ............... 328/109, 110, 114, 118, 328/120, 152, 154, 133

[56] References Cited

U.S. PATENT DOCUMENTS 3,532,996 10/1970 Wallace et al. ................... 328/154
3,629,713 12/1971 Szpilka ............................ 328/110
3,803,497 4/1974 Tyau ............................... 328/154
4,214,213 7/1980 Ferrie ............................. 328/154

*Primary Examiner*—John S. Heyman
*Attorney, Agent, or Firm*—Kenyon & Kenyon

[57] ABSTRACT

A system for selecting a signal having a median frequency from a plurality of periodic signals of different frequencies. In one embodiment, three such periodic signals are converted into corresponding pulse sequences, each having a duty cycle of approximately unity and a frequency which corresponds to the frequency of its associated periodic signal. An output signal is generated which assumes a first logic state when a positive signal slope of a first pulse sequence, which places the first pulse sequence in a first logic state and occurs while the output signal is in a second logic state, is followed by a further positive signal slope of a second pulse sequence, while the first pulse sequence is in its first logic state. The output signal assumes a second logic state when successively negative pulse sequence slopes occur.

4 Claims, 5 Drawing Figures

METHOD AND APPARATUS FOR DIGITAL FREQUENCY SELECTION

BACKGROUND OF THE INVENTION

This invention relates generally to systems for determining a mean frequency of a plurality of signal sequences, and more particularly, to a system for determining a median frequency of three periodic digital pulse sequences.

Electronic systems for selecting a median frequency from a plurality of signals find application in the fields of measurement, control, and regulation engineering. Such systems, however, have heretofore required complex processing equipment which converts the original data in the form of periodic signal sequences into equivalent intermediate variables and parameters. Further processing is then required to produce a signal responsive to the desired median frequency. There is a need, therefore, for a system which produces the desired median frequency signal directly from the plural original periodic signal sequences. Such a system would be particularly useful in fail-safe monitoring equipment which transmits measurement information over a plurality of redundant channels so as to achieve a desired degree of system reliability.

It is a further problem with known systems that noise and interference signals may undesirably couple with one or more of the redundant measurement channels. Such undesirable coupling may be inductive in nature and result in the transmission of erroneous measurement information. There is, therefore, a need for systems which can distinguish measurement channels which have been subjected to such undesirable signal coupling, from undisturbed channels.

It is, therefore, an object of this invention to provide a multiple channel measuring system which simply and economically determines a median system frequency.

It is a further object of this invention to provide an improved multiple channel measurement system which can distinguish between disturbed and undisturbed channels.

SUMMARY OF THE INVENTION

The foregoing and other objects are achieved by this invention which provides a system which converts the signal sequences on each of a plurality of channels into a corresponding square-wave signal which has the same frequency as the signal sequence on its corresponding signal channel, and a duty cycle of approximately unity. Thus, each such square wave signal channel signal has a first (high) logic state, a second (low) logic state, and corresponding positive (rising) and negative (decaying) slopes therebetween. In an embodiment of the invention having three square-wave-converted signal channel signals (hereinafter "channel signals"), an output signal enters a (high) logic state when, after a first one of the channel signals experiences a positive slope, a second one of the channel signals experiences a positive slope while the first channel signal is still in its first logic state. The output signal will experience a positive slope and enter its first logic state in response to the positive slope of the second channel signal, if it occurs while the first channel signal is still in its first logic state. In other words, the first channel will experience a positive slope and enter its first logic state while the output signal is in its second (low) logic state. If, while the first channel signal is in its first logic state, the second channel signal experiences a positive slope, the output signal will responsively experience a positive slope and enter into its first logic state. Conversely, if any one of the channel signals experiences a negative slope so as to enter its second logic state while the output signal is in its first logic state, and another one of the channel signals experiences a negative slope while the first signal to experience its negative slope is in its second logic state, the output signal will experience a negative slope and enter its second logic state in response to the negative slope of this other channel signal.

In a specific illustrative embodiment of the invention which is used for monitoring the speed of a turbine, a pulse-magnetized disc is mechanically coupled to a shaft of the turbine. Three magnetic pick-up devices are arranged near the circumference of the pulse magnetized disc, and receive signals corresponding to the angular velocity of the turbine. Electronic circuitry, which may be in the form of a bistable multivibrator is associated with each pick-up device for producing the corresponding square-wave channel signals. The three channel signals are conducted to respective bistable multivibrators by means of logic circuitry. Further logic circuitry couples the output terminals of the respective multivibrators to first and second OR gates. The first and second OR gates are coupled at their output terminals to the set and reset inputs, respectively, of an output multivibrator. The output signal is obtained at an output terminal of the output multivibrator.

It is a feature of this invention that the effects of undesirable interfering pulse signals are suppressed so as not to effect the frequency of the output signal.

BRIEF DESCRIPTION OF THE DRAWINGS

Comprehension of the invention is facilitated by reading the following detailed description in conjunction with the annexed drawings, in which.

DETAILED DESCRIPTION

Figure 1:
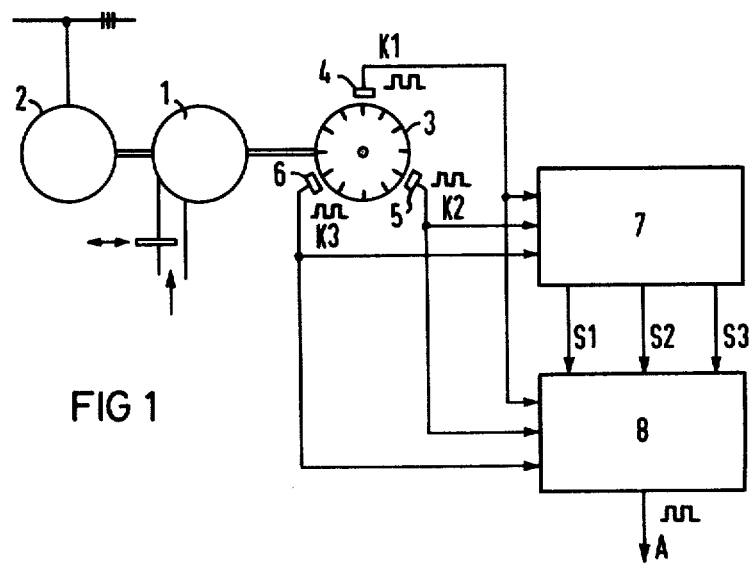
FIG. 1 shows, partly in schematic form and partly in block and line representation, a preferred embodiment of the invention.

FIG. 1 shows a preferred illustrative embodiment of the invention wherein a turbine 1 is coupled to a generator 2 for supplying electrical energy to a network (not specifically identified). Turbine 1 is further coupled to a pulse disc 3 which contains along its circumference a plurality of permanent magnets which are disposed at regular angular intervals, and represented in the figure by short radial lines near the circumference of pulse disc 3. Three magnetic pulse detectors, 4, 5, and 6, are arranged around the circumference of pulse disc 3. In some embodiments, the magnetic pulse detectors may be Hall generators which, when pulse disc 3 rotates, produce rectangular pulse sequences K1, K2, and K3, respectively. The frequency of each of the rectangular pulse sequences is proportional to the speed of the turbine. A pulse forming stage (not shown) may be included in each of the magnetic pulse detectors for ensuring that rectangular pulse sequences K1, K2, and K3 each have a duty cycle of approximately unity. Pulse forming stages of the type discussed herein are known to persons skilled in the art.

The rectangular pulse sequences are conducted to a limit monitoring circuit 7 and a selection circuit 8. Output signals S1, S2, and S3, from limit monitoring circuit 7 are also conducted to selection circuit 8. Limit monitoring circuit 7 operates so that when all of the rectangular pulse sequences, K1, K2, and K3, are present, and the frequency of none of these rectangular pulse sequences is less than the frequency of either of the other two rectangular pulse sequences by a predeterminable fraction, output signals S1, S2, and S3 are continuous. If, on the other hand, one of the rectangular pulse sequences is either not present or has a frequency which is less than the frequency of the other two pulse sequences by a predeterminable fraction thereof, a corresponding one of the output signals of limit monitoring circuit 7 will assume a magnitude of zero. This operation assures redundant, 3-channel processing of the measurement of the speed of the turbine, and permits a defective signal channel to be detected. If one such signal channel becomes defective, measurement of the speed of rotation of the turbine may nevertheless proceed by the processing of the channel signal on one of the remaining operative signal channels.

Figure 2:
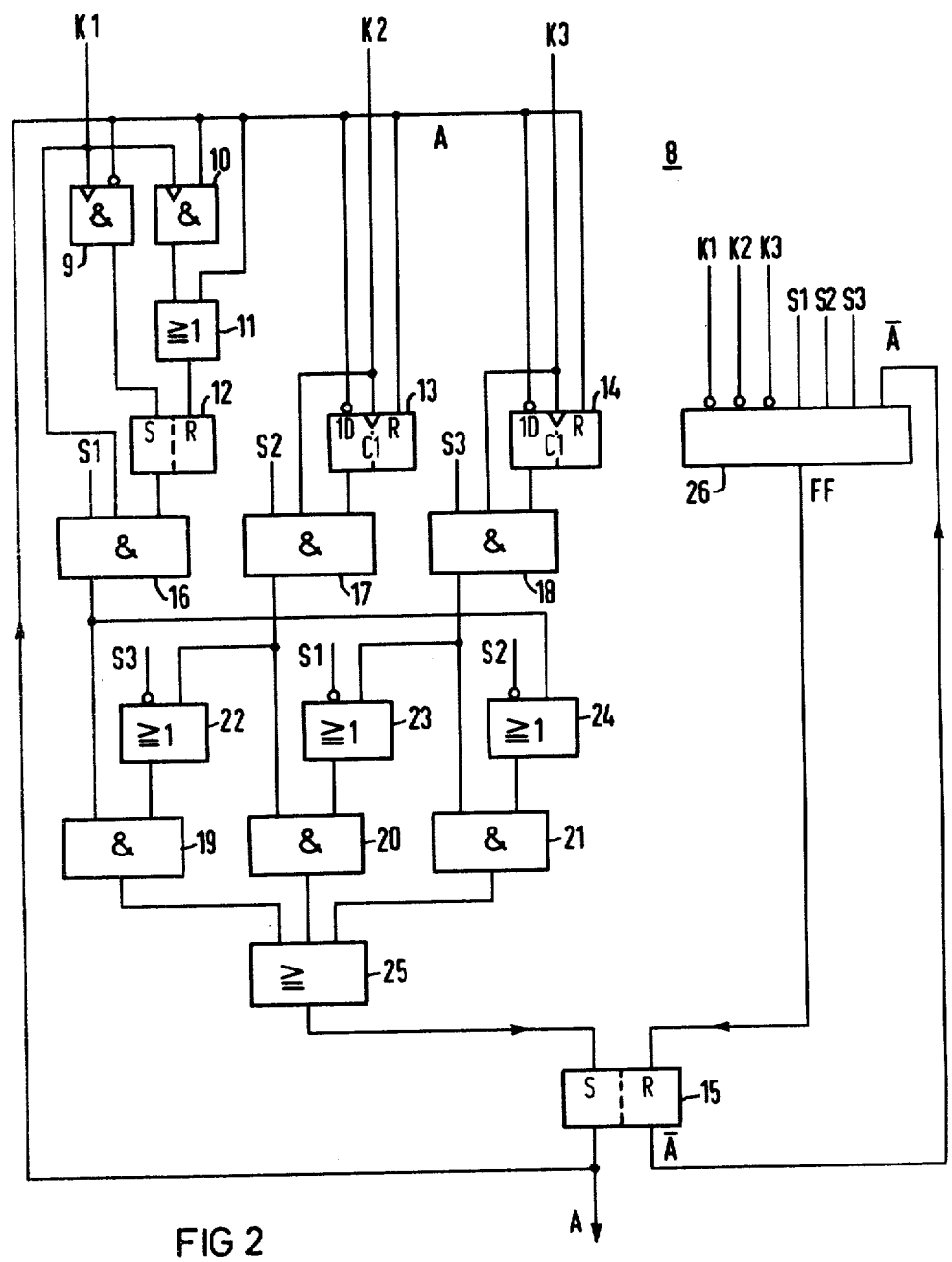
FIG. 2 is a block and line representation of logic circuitry of a frequency selection circuit 8 in FIG. 1.

FIG. 2 shows simple logic circuitry for producing an embodiment of a frequency selection circuit 8 which operates in accordance with the principles of the invention, and which suppresses interference pulses which may occur in the signal channels. Rectangular pulse sequence K1 is conducted to respective input terminals of AND gates 9 and 10. The remaining input terminals of AND gates 9 and 10 receive inverted and non-inverted versions, respectively, of an output signal A of an output multivibrator 15. The output of AND gate 10 and output signal A are conducted to respective terminals of an OR gate 11. OR gate 11 is coupled at its output terminal to a reset input of a bistable multivibrator 12. AND gate 9 is coupled at its output terminal to a set input of bistable multivibrator. The set and reset input terminals of bistable multivibrator 12 are designated with S and R, respectively.

Logic blocks 13 and 14, which are associated with signal channels K2 and K3, respectively, represent logic circuitry equivalent to logic circuit elements 9, 10, 11, and 12, which are associated with signal channel K1. An output terminal of bistable multivibrator 12, which corresponds to its set input, is connected to an input terminal of AND gate 16. Rectangular pulse sequence K1 is conducted to a second input terminal of AND gate 16. Similarly, AND gates 17 and 18 receive at respective input terminals the set outputs of their associated bistable multivibrators, and their corresponding rectangular pulse sequences. AND gates 16, 17, and 18 are coupled at their output terminals to respective first input terminals of AND gates 19, 20, and 21. AND gates 19, 20, and 21 receive at their respective second input terminals the outputs of corresponding ones of OR gates 22, 23, and 24, which OR gates receive at their input terminals the output signals from respective AND gates 16, 17, and 18, which are associated with other signal channels than the one with which the particular OR gate is associated. Thus, for example, OR gate 22 which is associated with signal channel K1 receives at its input terminal the output signal from AND gate 17, which is associated with signal channel K2. AND gates 19, 20, and 21 are coupled at their output terminals to respective input terminals of an OR gate 25. OR gate 25 is coupled at its output terminal to the set input terminal of multivibrator 15. Output signals S1, S2, and S3 from limit monitoring circuit 7 are conducted directly to respective input terminals of AND gates 16, 17, and 18 and in an inverted form to respective input terminals of OR gates 22, 23, and 24.

Logic block 26 represent logic circuitry identical to that described hereinabove, which is shown on the left of FIG. 2. Logic block 26, however, receives rectangular pulse sequences K1, K2, and K3, in an inverted form with respect to the above described circuitry. Moreover, circuit block 26 receives an inverted form of output signal A from output multivibrator 15, and is designated by $\overline{A}$. If output signals S1, S2, and S3 are present so as to have a value of logical 1 which indicates that no channel has failed or has too low a pulse frequency, the circuitry shown in FIG. 2 operates in the manner discussed above. Thus, if output signal A of bistable multivibrator 15, which operates to reset bistable multivibrator 12, 13, and 14, changes from a first (high) logic state to a second (low) logic state, then bi-stable multivibrators 12, 13, and 14 are prepared for being set by the pulses of their corresponding rectangular pulse sequences K1, K2, and K3. The first positive slope of any of the rectangular pulse sequences K1, K2, and K3 to reach the S input of its associated one of bistable multivibrators 12, 13, and 14 will cause the output of that multivibrator to assume a first logic state. The next-following positive slope to be received at either of the other two signal channels will cause the associated one of the bistable multivibrators to assume a first logic state output. The first and subsequently second high logic state output signal of two separate bistable multivibrators will be conducted through associated ones of AND gates 16-21, OR gate 25, and to input S of output multivibrator 15. Thus, if a second rectangular pulse signal achieves a first logic state while a first rectangular pulse signal is in a first logic state, a first logic state will be conducted to the set input of output multivibrator 15 so as to cause output signal A to assume a first (high) logic state. The first logic state of output signal A is inverted at its input to AND gate 9, thereby preventing the left half of selection circuit 8 from being affected by any of the rectangular pulse sequences K1, K2, or K3. At this point, the inverted forms of the rectangular pulse sequences operate upon the right half (circuit block 26), of selection circuit 8. Thus, complementary output signal $\overline{A}$ has a second (low) logic state value until two successive negative slopes appear in corresponding rectangular pulse sequences K1, K2, and K3. At the instant that the second one of the negative slopes occurs, while the channel signal which produced the first negative slope is in its second logic state, circuit block 26 will produce a first logic state signal which is conducted to input terminal R of output multivibrator 15. This will cause complementary output signal $\overline{A}$ to assume a first logic state value, and the output signal A to switch to a second logic state value. Also, the circuitry on the left side of FIG. 8 once again becomes responsive to the positive slopes of rectangular pulse sequences K1, K2, and K3.

In situations where one of the signal channels is defective, thereby causing one of the output signals S1, S2, and S3 to have a second (low) logic state, one of the AND gates 16, 17, or 18 is disabled, and one of the OR gates 22, 23, or 24 is permanently enabled. Such a condition permits only one of the remaining operative channels to cause output multivibrators 15 to set. Conversely, the complementary signal of this operative channel will operate through logic block 26 to cause output multivibrator 15 to reset. For example, if the signal channel with rectangular pulse sequence K3 were to fail, S3 would assume a low logic state, and output signals S1 and S2 would have high logic states. Accordingly, AND gates 18, 20, and 21, are disabled while OR gate 22 is permanently enabled (high output logic state). Thus, only the positive slopes from pulse sequence K1 can cause output multivibrator 15 to be set by means of AND gate 19. Similarly, only the negative slopes of pulse sequence K1, which operate circuit block 26, can cause output multivibrator 15 to be reset. In this hypothetical fault case, output signal A lags rectangular pulse sequence K1.

Selection circuit 8, which operates in the manner describes hereinabove, makes it possible to select, from three pulse sequences of different frequencies, the one with the median frequency. Moreover as will be shown below, this circuit reliably supresses the effect of induced interference pulses, which could otherwise produce an erroneous output signal.

Figure 3:
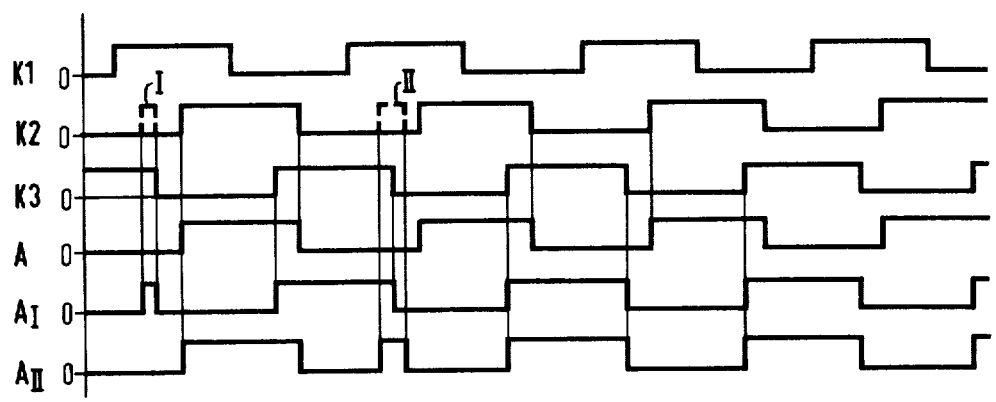
FIG. 3 is a digital signal timing diagram which illustrates the interference pulse signal suppression characteristics of the preferred embodiment.

FIG. 3 shows a digital timing diagram which is useful for explaining the manner in which the adverse effects of induced interference pulses are supressers. The wave forms of rectangular pulse sequences K1, K2, and K3 are shown in the top three time scales of the figure. Output signal A of bistable multivibrator 15 is shown in the case wherein no interference pulses occur. In the case wherein interference pulse I is present on the wave form of rectangular pulse sequence K2, a correspondence output wave form of bistable multivibrator 15 is shown as wave form $A_I$ in the figure. Similarly, in the situation wherein rectangular pulse sequence K2 contains an interference pulse II, the resulting of output signal of bistable multivibrator 15 is shown as wave form $A_{II}$. It is evident from FIG. 3 that the interference pulses cause a change only in the duty cycle of the output signal, and thereby do not effect pulse counting, or pulse frequency. In the case of wave form A, which is not disturbed with interference pulses, the output signal follows rectangular pulse sequence K2. If an interference pulse occurs, rectangular pulse sequence K3 determines the frequency of the output signal.

Figure 4:
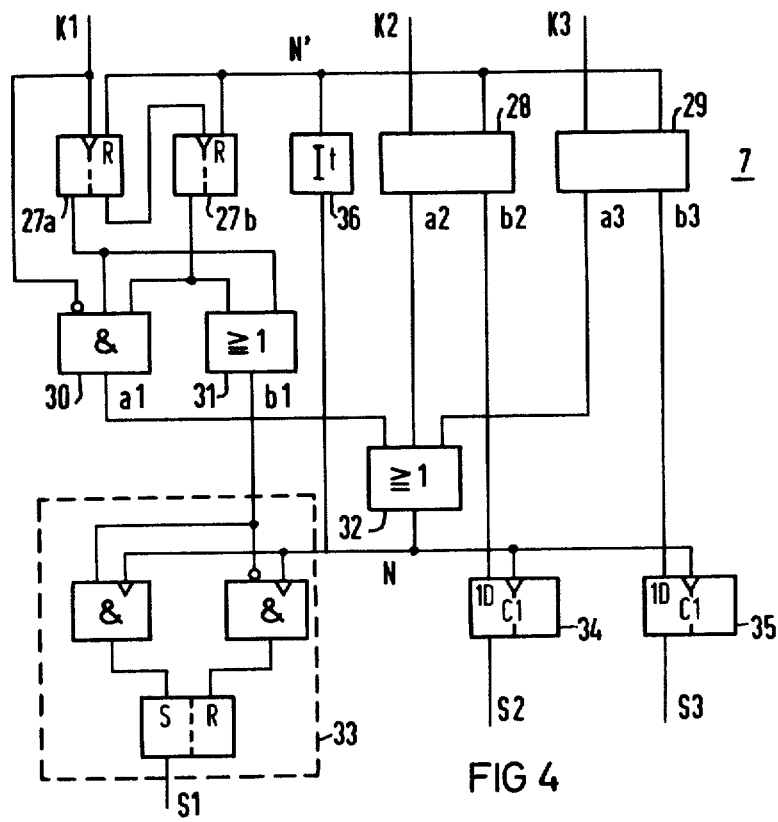
FIG. 4 shows a block and line representation of logic circuitry which is useful as monitoring circuit 7 in FIG. 1.

FIG. 4 shows logic circuitry for performing the functions of limit monitoring circuit 7 in FIG. 1. In FIG. 4, logic circuitry associated with rectangular pulse sequence K1 is shown in detail, in accordance with DIN Standard 40700, Part 14, of July 1976. The logic circuitry associated with remaining signal channels K2 and K3 are shown in condensed form. Each rectangular pulse sequence drives a 2-bit counter, which may consist of two T-multivibrators, 27a and 27b. Set outputs of T-multivibrators 27a and 27b, which are associated with setting inputs thereof, are connected to respective inputs of an AND gate 30 and an OR gate 31. AND gate 30 and OR 31 have outputs a1 and b1. Signal channels K2 and K3 have corresponding AND gate and OR gate outputs a2, b2, and a3 and b3. The outputs a1, a2, and a3 of the AND gates are connected to respective inputs of an OR gate 32. OR gate 32 provides at its output terminal a signal N which causes the output signal of OR gate 31 at output terminal b1 to be transferred into data multivibrator 33. Similarly, the output signals on outputs b2 and b3 are transferred to corresponding data multivibrators 34 and 35. In addition, after a small delay of duration t, resulting from delay stage 36, all of the T-multivibrators, such as 27a and 27b, are reset.

After each third pulse on each signal channel, a first logic state signal appears at respective outputs a1, a2, and a3. A first logic state signal appears at output b1, b2, or b3 after the first pulse of each signal channel, following the respective resetting. Thus, a first logic state signal is produced at the output of data multivibrators 33, 34, and 35, only if none of rectangular pulse sequences K1, K2, and K3, is less than one-third of the frequency of the other two rectangular pulse sequences. If the frequency of a rectangular pulse sequence is less than this fraction, then a second (low) logic state signal appears at the output of the corresponding data multivibrator, thereby indicating the defective channel.

Figure 5:
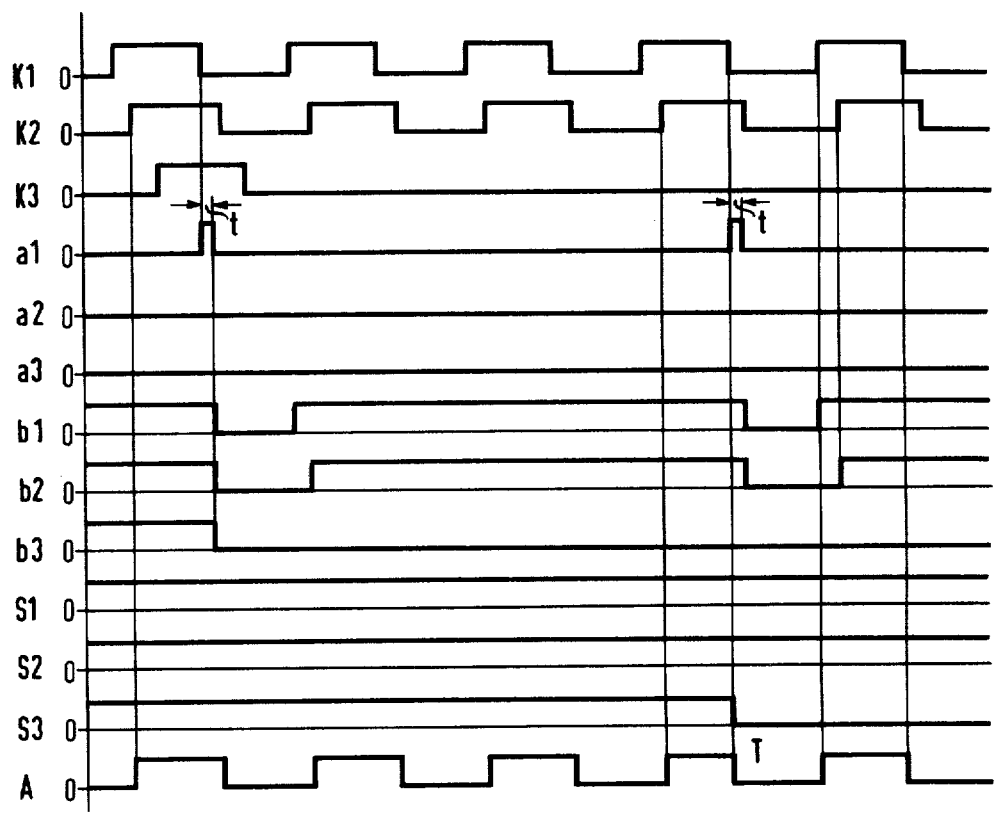
FIG. 5 is a digital signal timing diagram which is useful for explaining the operation of monitoring circuit 7 in FIG. 4.

FIG. 5 shows a digital timing diagram which serves to illustrate the operation of limit monitoring circuit 7, shown in FIG. 4. The various wave forms are identified with reference symbols which correspond to rectangular pulse sequences K1, K2, and K3; AND gate outputs a1, a2, and a3; OR gate outputs b1, b2, and b3; data multivibrator outputs S1, S2, and S3; and output signal A of output multivibrator 15. It is assumed in this figure that the signal channel corresponding to rectangular pulse sequence K3 has failed. The fault condition is recognized after the end of the third pulse of rectangular pulse sequence K1, after the failure of rectangular pulse sequence K3. The fault is recognized by the condition of signal S3 which assumes a second logic state. As described hereinabove with respect to FIG. 2, the fault condition produces a switch-over of monitoring circuit 8 to single channel operation. Accordingly, output signal A of multivibrator 15 follows rectangular pulse sequence K1.

It is to be remembered that, although the inventive concept disclosed herein is described in terms of specific embodiments and particular applications, persons skilled in the pertinent art can generate additional embodiments without departing from the spirit or exceeding the scope of the invention. Thus, for example, the principle of monitoring a plurality of individual signal channels to determine whether during a predetermined number n of pulses in a channel, at least a predetermined number m of pulses have appeared in the remaining channels, is not limited to the case of $n=3$ and $m=1$, shown in the specific illustrative embodiment of FIG. 4. Persons of skill in the art can devise circuitry for other values of m and n, as long as n is larger than m, so as to achieve other response ratios, n:m. In the light of this teaching, persons skilled in the art would understand that only the number of stages in the binary counters in the circuit of FIG. 4, and the gate circuitry which interrogates the counter outputs must be modified. The drawings and descriptions thereof in this disclosure are illustrative of the principles of the invention, and should not be construed to limit the scope thereof.

What is claimed is:

1. A method for selecting a signal having a median frequency from first, second and third periodic signals of different frequencies, the method comprising the steps of:
   a. converting the first, second and third periodic signals into respective first, second and third pulse sequences, each said pulse sequence having a duty cycle of approximately unity and a frequency which corresponds to the frequency of its associated periodic signal, each said pulse sequence being formed of a sequence of first and second logic signal states which are preceded by positive and negative signal slopes, respectively;

b. producing an output signal which assumes a first logic signal state when a positive signal slope of said first pulse sequence, which places said first pulse sequence in said first logic signal state and occurs while said output signal is in a second logic signal state, is followed by a positive signal slope of said second pulse sequence, while said first pulse sequence is in a first logic signal state; and c. causing said output signal to assume a second logic signal state when an initiating negative signal slope is an initiating one of said first, second and third pulse sequences, which places said initiating pulse sequence which experienced said initiating negative signal slope in said second logic signal state and occurs while said output signal is in said first logic signal state, is followed by a further negative signal slope of a remaining one of said first, second and third pulse sequences, which did not experience said initiating negative signal slope, said further negative signal slope occuring while said initiating pulse sequence which experienced said initiating negative signal slope is in said second logic signal state.

2. A circuit for selecting a signal having a median frequency from first, second and third periodic signals of different frequencies, the circuit comprising:

output bistable multivibrator means for producing first and second output signals, said output bistable multivibrator means having setting and resetting input terminals for receiving first and second output control signals, respectively;

first and second OR gate means, each having first, second and third input terminals, and an output terminal for providing said first and second output control signals, respectively, said output terminals being connected to said setting and resetting input terminals, respectively, of said output bistable multivibrators means;

first, second and third pulse former means for producing first, second and third pulse sequences in response to the first, second and third periodic signals of different frequencies, each said pulse sequence having a duty cycle of approximately unity and a frequency which corresponds to the frequency of its associated periodic signal, each said pulse sequence being formed of a sequence of first and second logic signal states which are preceded by positive and negative signal slopes, respectively;

first through sixth input bistable multivibrator means, each having setting and resetting input terminals and an output terminal for providing respective third output signals, said setting input terminals being adapted for receiving respective ones of said pulse sequences, said third output signals assuming first logic signal states in response to a selectable one of said positive and negative signal slopes of said respective pulse sequences, and said resetting input terminals being adapted to receive a selectable one of said first and second output signals, respectively, from said output bistable multivibrator means;

first through sixth AND gate means, each having a first input terminal for receiving said third output signal from an associated one of said first through sixth input bistable multivibrators, a second input terminal for receiving an associated one of said first, second and third pulse sequences, and an output terminal; and seventh through twelfth AND gate means, each having first and second input terminals connected to respective output terminals of two preselected ones of said first through sixth AND gate means, and an output terminal, each said output terminal being connected to an input terminal of a selectable one of said first and second OR gate means.

3. The circuit of claim 2 wherein there is further provided:

a limit monitoring circuit for providing first, second and third monitor signals, said monitor signals being responsive to a difference in frequency between said first, second and third pulse sequences, respectively, said first, second and third monitor signals being conducted to a respective third input terminal of said first, second and third AND gate means; and a plurality of inverter means for conducting inverted versions of said first, second and third monitor signals to respective third input terminals of said fourth, fifth and sixth AND gate means.

4. The circuit of claim 3 wherein said limit monitoring circuit further comprises:

a plurality of two-bit counters for counting said logic state sequences of respective ones of said pulse sequences, said two-bit counters each producing a respective enabling signal upon every third logic state sequence counted;

an OR gate for producing at an output terminal thereof a monitoring control signal responsive to said pulse enabling signals;

a plurality of data multivibrators for producing said first, second and third monitor signals in response to said monitoring control signal; and delay means for resetting said plurality of two-bit counters in response to said monitoring control signal.

* * * * *